United States Patent
Choronski et al.

(10) Patent No.: US 7,832,368 B2
(45) Date of Patent: Nov. 16, 2010

(54) OPPOSITE RADIAL ROTARY-PISTON ENGINE OF CHORONSKI

(76) Inventors: Evgeni Choronski, Str. Lashich 1 Apt 58, Ashkelon (IL) 78714; Boris Moukhaev, Yoa Khin Ha Melech 9, Apt 32, Ashdod (IL) 77483

( * ) Notice: Subject to any disclaimer, the term of this patent is extended or adjusted under 35 U.S.C. 154(b) by 317 days.

(21) Appl. No.: 12/214,488

(22) Filed: Jun. 19, 2008

(65) Prior Publication Data
US 2009/0314250 A1 Dec. 24, 2009

(51) Int. Cl.
F02B 25/00 (2006.01)
F02B 33/08 (2006.01)
F02B 33/14 (2006.01)
F02B 75/28 (2006.01)
F02B 75/30 (2006.01)

(52) U.S. Cl. .................. 123/70 R; 123/51 R; 123/51 A; 123/45 R

(58) Field of Classification Search ............... 123/43 R, 123/45 R, 50 A, 51 R, 70 R
See application file for complete search history.

(56) References Cited

U.S. PATENT DOCUMENTS

| | | | | |
|---|---|---|---|---|
| 1,557,395 A | * | 10/1925 | Augustine | 123/70 R |
| 2,347,444 A | * | 4/1944 | Vincent | 123/70 R |
| 4,090,479 A | * | 5/1978 | Kaye | 123/306 |
| 2004/0163532 A1 | * | 8/2004 | Harcourt et al. | 92/56 |
| 2005/0172918 A1 | * | 8/2005 | Humphries | 123/56.2 |

* cited by examiner

Primary Examiner—Thai Ba Trieu
(74) Attorney, Agent, or Firm—Aleksandr Smushkovich

(57) ABSTRACT

A two-stroke opposite radial rotary-piston engine is proposed, comprising a block including sleeves, pairs of pistons disposed within the sleeves and oppositely movable, guiding bearings, a power takeoff shaft, rotors mounted thereon having an inner surface formed by a closed curved line, the rotors' transverse axes are predeterminedly disposed. On the frontal part, the rotors have concaved surface portions along the curved line. T-like traverses are mounted, pair-wise spanning the pistons. The traverses include convex protrusions, cooperating with the concaved portions during the start of the engine. A clearance between the concaved and convex portions is provided after the start. The engine comprises support bearings, coupled to traverses. Support bearings include an external bushing, rolling over the inner surface of the rotor associated with the traverse, thereby impelling the rotor. Other elements and alternative module embodiments are added, enhancing the efficiency, size, weight, and power variety of the engine.

14 Claims, 8 Drawing Sheets

Fig.1b  Section B-B

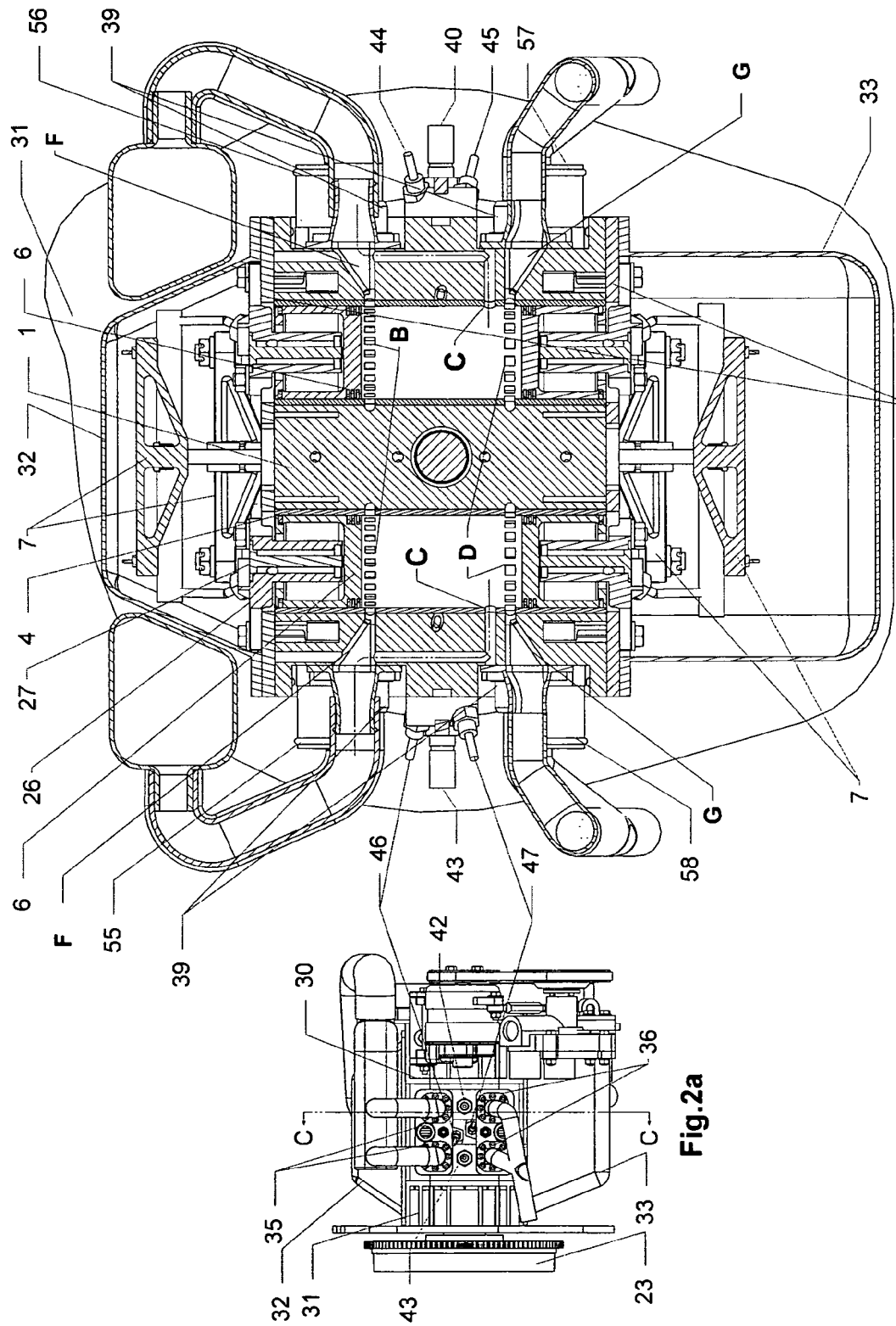

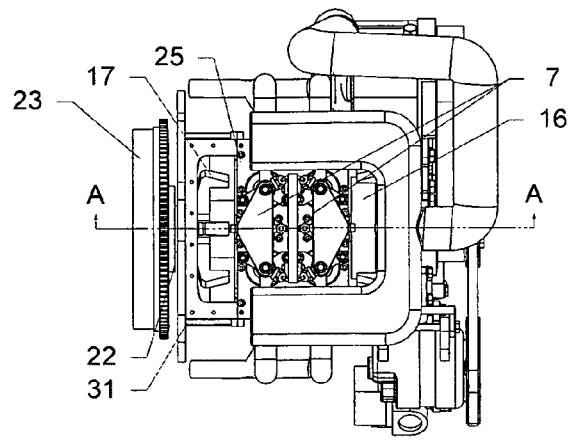
Fig.3a
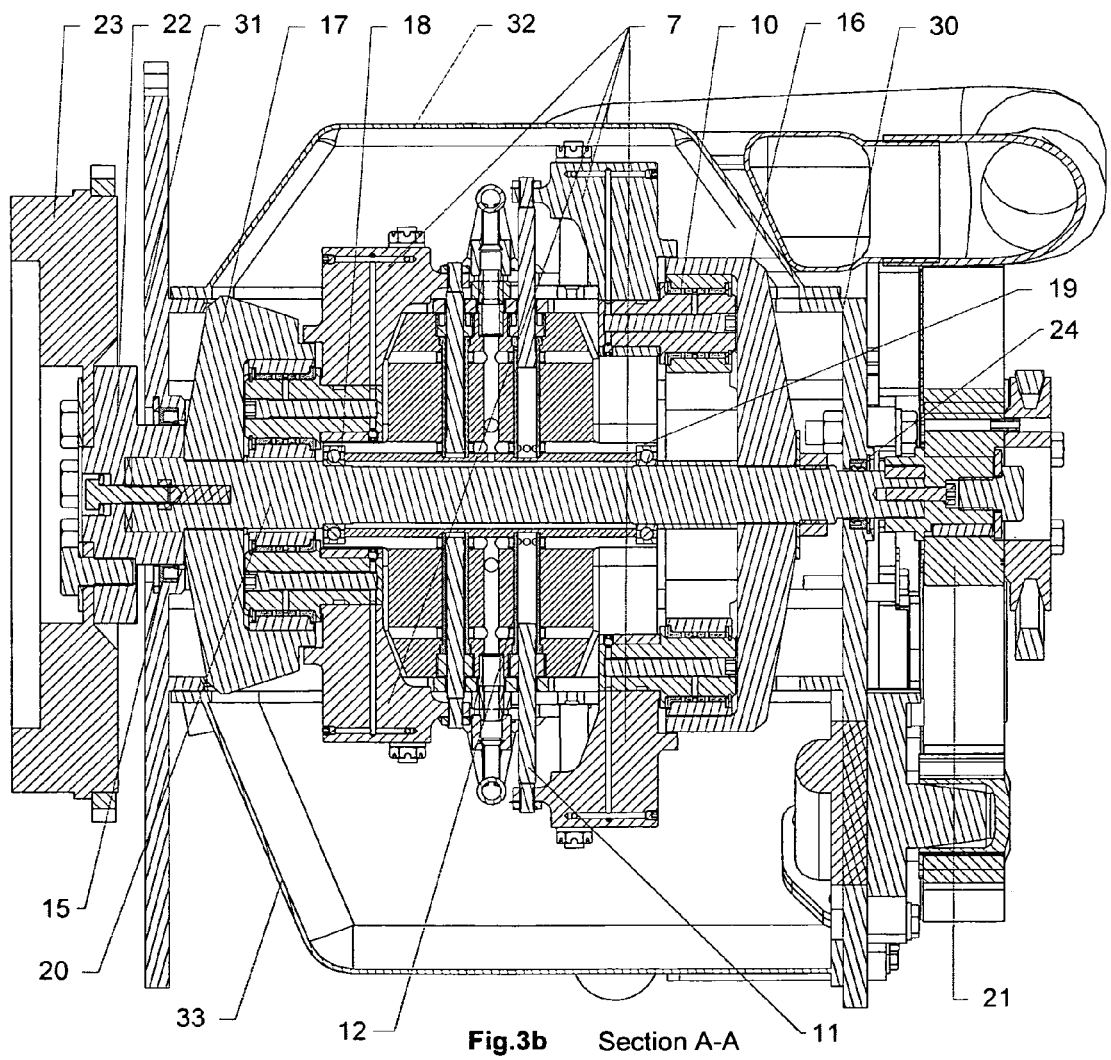
Fig.3b Section A-A

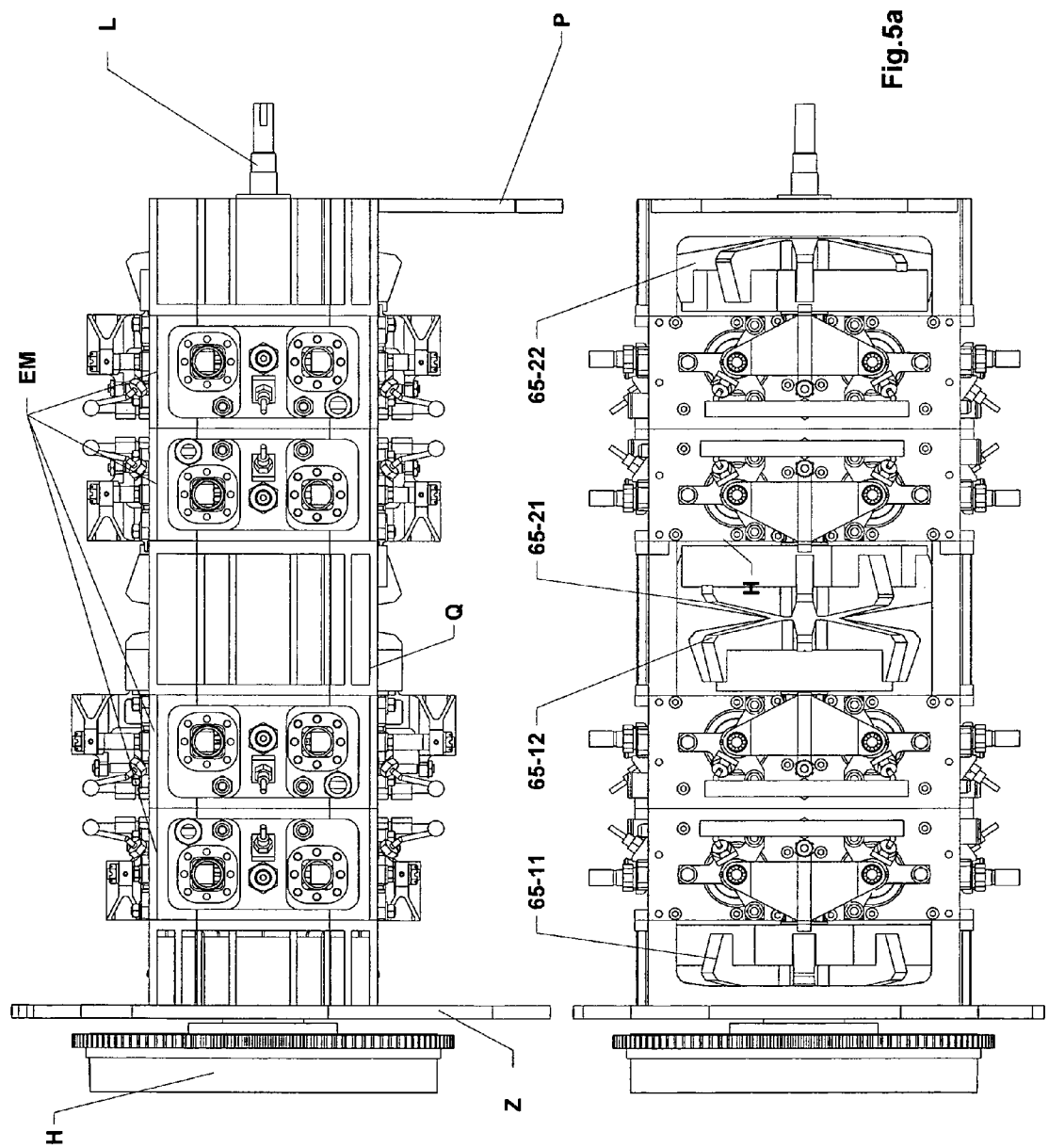

OPPOSITE RADIAL ROTARY-PISTON ENGINE OF CHORONSKI

FIELD OF THE INVENTION

The invention relates to opposite radial rotary-piston engines that can be utilized in ground vehicles, water vehicles, aircraft, in combinations with generators, etc.

BACKGROUND OF THE INVENTION

In the prior art there are known several constructions of centrifugal-piston or rotary-piston engines (herein further called ORPE), which are intended to eliminate certain disadvantages of conventional piston engines. E.g., such constructions are described in DE3907307, U.S. Pat. No. 6,279,518, U.S. Pat. No. 4,334,506, WO2005098202, RU2143572, and JP7113452. The latter, for instance, has the purpose "to suppress the side pressure applied to a piston, improve efficiency, reduce vibration and drastically reduce dimension and weight, by revolving a cam on the inner wall of an ellipse without using a crank, in reciprocating motion." The other above indicated constructions typically have similar purposes.

DE3907307 discloses a four-stroke engine wherein a cylinder block revolves inside a rotor, which is complicated, has a small resource of the valve system, and an imbalance with the revolving system including movable parts.

U.S. Pat. No. 6,279,518 discloses a four-stroke engine having a valve system and a conically shaped rotor. FIG. 7 shows a conical rotor with an elliptical groove, and a series of pistons followers inside the groove. It is a complicated unit with substantial friction losses, which has a limited operation resource for its loaded parts. The construction does not eliminate the side forces exerted by the piston upon the cylinder walls.

RU 2143572 discloses a four-stroke engine, wherein the cylinder block revolves at an elliptical trajectory, and the inlet/outlet system includes a rotatable valve. The construction is complicated and difficult to balance (which is admitted by its author). The piston acts via its rod and a sliding bearing upon an elliptical housing. The place of contact with the housing experiences high friction and heating, and thus will have a short operation resource.

From the instant inventors' point of view, a more advanced design of ORPE is presented in U.S. Pat. No. 6,161,508. It describes a radial-piston engine of rotary type of the kind having a valve system comprising apertured disc rings arranged in intersliding relationship, one of said rings being stationary while the other one is arranged to take part in the rotary motion of the rotor. The valve opening relationship is determined by the manual angular positions of the discs. In accordance with the invention, filed injection takes place via an injection nozzle positioned in the stationary disc. The valve ring is formed with a through opening which in response to the position assumed by the rotor at the moment of fuel ignition forms an open communication means between the injection nozzle and the combustion chamber.

That engine however has also certain drawbacks and limitations. It is built as a four-stroke engine having a cylinder block revolving around and impelling a rotor. Reaction forces produced in support bearings are very significant that leads to a short operation resource period. It uses an inlet/outlet system based on a rotatable sliding valve. This necessitates the use of complicated sealing means that, as a rule, have very limited operation resource (typically 100 hours maximum). The rotating cylinder block with linearly reciprocating pistons is very hard to balance, and thusly will cause intensive destructive vibrations. These problems are successfully resolved in the present invention.

A reciprocating rotary engine is taught in U.S. Pat. No. 4,334,506: "Rotary engine having a hollow, stationary block with manifolds for air inlet and exhaust valving and means for supplying fuel. The block supports one or more in-line cylinders which are provided with opposed pistons equipped with rigid and constrained piston rods. The rods carry bearings that run along a cam track surface interior to a disc, the outer surface of which is a right circular cylinder. The surrounding right circular cylinder rotates as a result of the linear movement of the opposed pistons thereby providing mechanical power. The cam surface is a continuous track which determines the out-put motion of the piston movement between top and bottom dead center. Arcuate areas at top and/or bottom dead center permit constant volume combustion and/or exhaust as desired during a particular cycle, whether that cycle be Otto or Diesel and whether it be two or four stroke." At least one of drawbacks of that design is that the spark plugs 48 and fuel lines 46 are situated inside the rotor. Hence, their replacement would require dissembling the entire engine, which makes maintenance of the engine taught in U.S. Pat. No. 4,334,506 more difficult.

Another example of ORPE, described in U.S. patent application Ser. No. 11/827,595 filed on Jul. 12, 2007 by the instant applicants, employs the non-typical form of conversion of the spinning motion of a rotor into a progressive linear stroke of a piston, and vice versa. This constructive solution provides for substantial absorption of side forces exerted by the piston onto engine cylinder's walls and vice-versa, and for an essential improvement of the weight and fuel consumption/power output ratios, demonstrating useful advantages over all presently utilized engines known to the applicants, including the Wankel rotor engine.

U.S. Pat. No. 7,584,726, hereby entirely incorporated by reference, discloses a two-stroke opposite rotary-piston engine that comprises a cylinder block including a sleeve and two pistons slidely disposed therein and oppositely movable, which pistons are forming a common combustion chamber situated between their heads, and forming a first gap with sleeve's sidewalls; a rotor having a surface formed by a closed symmetrical Cassini line (particularly, ellipse); traverses attached to the pistons; rollers attached to the traverses and springly depressed against the rotor; oil tubes with end bushings; oil supply and withdraw means; two plungers disposed in each tube forming a second gap with the tube's sidewalls, essentially less than the first gap. The plungers are attached to the traverses and oppositely movable, also including through throttling channels, outward surfaces forming external spaces with the bushings, and inward surfaces forming an internal space with the tube sidewalls, which internal space communicates with the oil supply means and the oil withdraw means. Engine's oil drain means communicate the external spaces with the oil supply means. The engine absorbs side and inertial forces, is more efficient and clean.

However, the design of engine taught in U.S. Pat. No. 7,584,726 has certain drawbacks: the rotor has a significant size and weight, the support roll bearings don't allow absorbing high loads, which shortens the service lifespan thereof. The power takeoff is carried out upon each 180-degree turn, i.e. the load characteristic is uneven that also reduces the lifespan and efficiency of that engine.

SUMMARY OF THE INVENTION

To overcome the mentioned drawbacks of the engine in U.S. Pat. No. 7,584,726, an inventive two-stroke opposite radial rotary-piston engine is proposed herein. It comprises a cylinder block including sleeves, pairs of pistons slidely disposed within the sleeves and oppositely movable, each piston has a rod. The engine comprises guiding bearings, a power takeoff shaft, two rotors mounted on the shaft, each having an inner surface formed by a closed curved line, the rotors' transverse axes are disposed mutually perpendicularly. On the frontal part, the rotors have concaved surface portions made along the curved line. The engine comprises T-like traverses, pair-wise spanning the rods of the pistons. Each traverse includes a convex spherical protrusion, cooperating with the concaved portion during a start of the engine. A clearance between the concaved and convex portions is provided after the start. The engine comprises support bearings, each coupled to one of the traverses. Support bearings each includes an external bushing, capable of rolling over the inner surface of the rotor associated with the traverse, thereby impelling the rotor. Other elements (orifices, etc.) are added, enhancing the efficiency, size, and weight of the engine. Alternative module engine embodiments are also described, providing power variety of the engines.

BRIEF DESCRIPTION OF THE DRAWINGS

FIG. 1b illustrates a lateral cross-sectional view of the assembled engine, according to the preferred embodiment of the present invention shown on FIG. 1a.

FIG. 2a illustrates a general frontal view of the assembled engine, according to the preferred embodiment of the present invention.

FIG. 2b illustrates a frontal cross-sectional view of the assembled engine, according to the preferred embodiment of the present invention shown on FIG. 2a.

FIG. 3a illustrates another general plan view of the assembled engine, according to the preferred embodiment of the present invention.

FIG. 3b illustrates a lateral cross-sectional view of the assembled engine, according to the preferred embodiment of the present invention shown on FIG. 3a.

FIG. 5a illustrates a front view and a plan view of an engine assembled of four modules, according to an alternative embodiment of the present invention.

Identical reference numerals in the drawings generally refer to the same elements in different figures, unless otherwise is specified in the description. A newly introduced numeral in the description is enclosed into parentheses.

DESCRIPTION OF A PREFERRED EMBODIMENT OF THE INVENTION

Figure 1A:
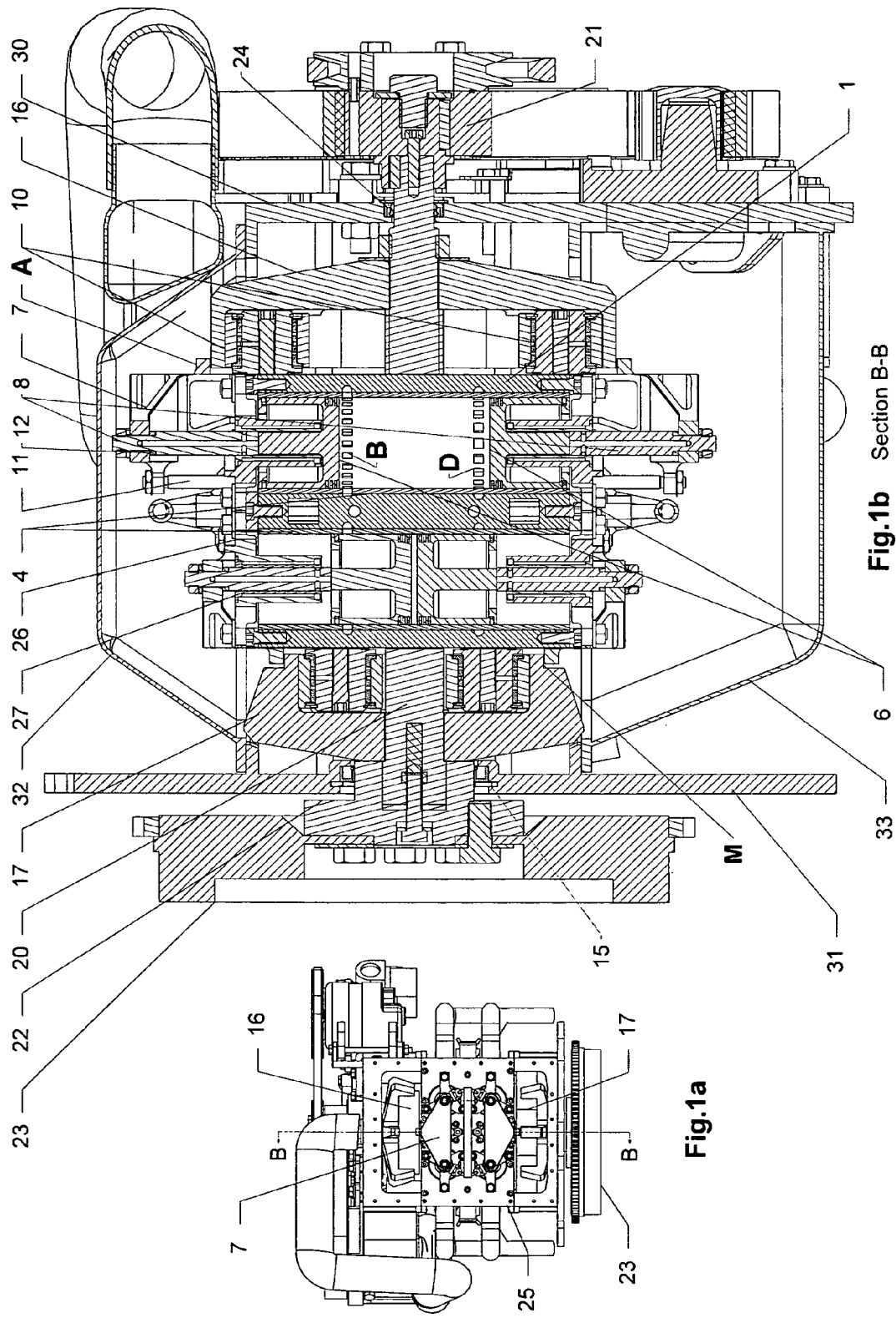
FIG. 1a illustrates a general plan view of the assembled engine, according to a preferred embodiment of the present invention.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

A preferred embodiment of the inventive engine is illustrated on FIGS. 1a, 1b, 2a, 2b, 3a, 3b, and 4. It is a two-stroke internal combustion engine featuring oppositely disposed pistons movable toward each other, which movement is essentially converted into the spinning of the rotors, also featuring the straight blowing of air through cylinders with the straight injection of fuel, and with liquid cooling.

The engine comprises a hollow stationary cylinder block (1) fixedly mounted, e.g. on a vehicle; a frontal housing (30) and a rear housing (31) fixedly mounted, e.g. on a vehicle; the housings 30 and 31 are coupled with the block 1 by bolts and an upper lid (32) and a bottom oil tray (33). The aforementioned elements are preferably made by means of casting. The block 1 is the power unit of the engine. Four cylinders or sleeves (4) are mounted pair-wise on the block 1 preferably by hot coupling. Other embodiments may include more such sleeves.

Two pistons (6) are slidely snug-fitted within each sleeve 4. Each piston 6 has a rod (8). Each piston 6 has a head situated oppositely to the rod. Each pair of the pistons 6 slidely disposed within one of sleeves 4, so that the rods 8 are facing the upper and lower openings of the corresponding sleeve 4. The facing each other heads of the pistons 6 and a portion of the inner sidewalls of the sleeve 4 between the heads define a common chamber that can be a blowing off, or an intermingling chamber, or a combustion chamber, depending on the phase of engine's operation.

The engine comprises a conventional supercharger pump (not illustrated), driven preferably by a belt transmission, to introduce air into the chamber. The engine comprises an inlet window (B) and outlet window (D) made in the sleeve 4, correspondingly communicating with an intake channel (F) and an exhaust channel (G) made in the block 1 (see FIG. 2b).

In preferred embodiments, the sleeve 4 has an orifice C communicating with the channel F (shown on FIG. 2b) for supply of air after the windows B and D are shut during a 6-7 degree turn of a power takeoff shaft that is described below. This enhances the filling of the sleeves with a fresh air portion during the mentioned angular turn. It allows achieving the coefficient of filling the sleeve to be equal to 1.0.

Besides, the orifice C is preferably aligned at a tangential direction to the sidewalls of the sleeve 4, which additionally makes air whirls in the sleeve, and improves the quality of the fuel-air mixture. The closing or opening of the windows B and D and the orifice C are provided by the pistons 6 during their movement within the sleeve 4. Configurations of the windows B and D and orifice C, their areas, and dispositions can be determined empirically for a particular design of the engine.

The pistons 6 with their rods 8 are pair-wise spanned with a T-like traverse (7) and attached to the traverse 7 preferably by means of a screw connection (FIGS. 1b, 2b). Due to the screw connection of the rods 8 with the traverse 7, it is possible to regulate the length of rod 8 during the assembling by means of a distance washer (12), mounted on the rod 8, that allows controlling the extent of compression. Thus, the engine comprises four traverses 7 shown on FIG. 1b.

Figure 4:
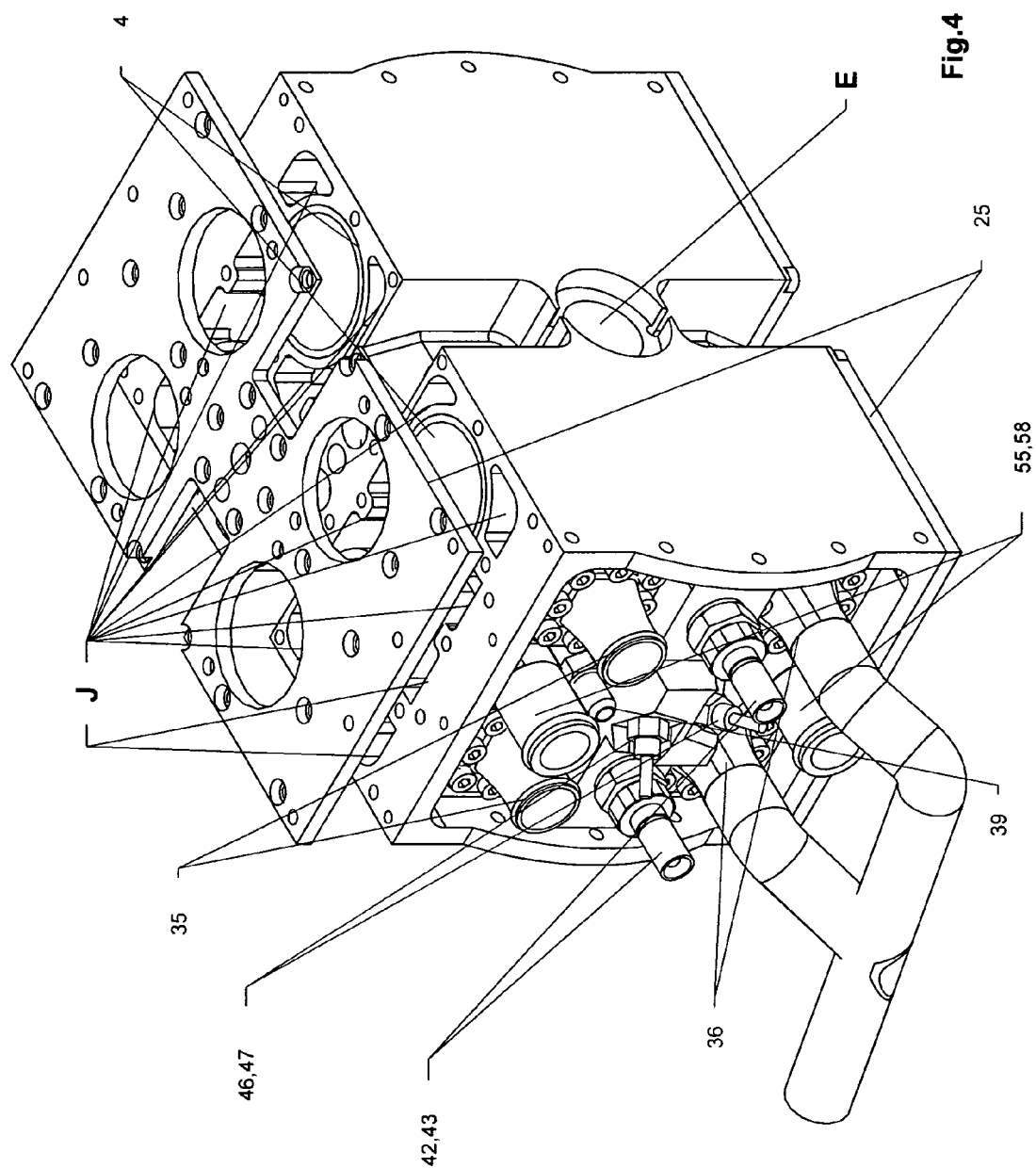
FIG. 4 illustrates an isometric partial view of the engine, according to the preferred embodiment of the present invention.

As illustrated on FIG. 4, the block 1 includes lids (25) and a plurality of through openings (J), which lids 25 and openings J jointly form a cooling jacket. The block 1 includes an opening (E) for mounting a power takeoff shaft (20), extending along the symmetry axis of the block 1, and perpendicularly the longitudinal axis of the sleeves 4. The block 1, depicted on FIG. 2b, houses: injectors (40,41,42,43), spark plugs (44,45,46,47), supply and withdraw pipes for cooling liquid (55,56,57,58), oil inlet connector pipes (39), attachment means of air inlet pipes (35), and exhaust gas pipes (36), all installed on the outer sides of the block 1 (illustrated on FIG. 4).

The shaft 20 is rotatably mounted on the block 1, and is supported preferably by two roll bearings (18) and (19) installed in the block 1, shown on FIG. 3. The shaft 20 extends through the housings 30 and 31. Seal cuffs (15) and (24) are mounted within housings 30 and 31.

The engine comprises two substantially identical rotors (16) and (17) mounted on the shaft 20, and fixed thereon preferably by dowels. The transverse axes of the rotors are disposed at a 90-degree angle in relation to each other. Each pair of traverses 7 is associated with one of the rotors as explained below.

The inner surface of the rotors 16 and 17 has a cylindrical shape having an inner operation surface formed by a predeterminedly curved line of a closed type. In preferred embodiments, the inner cylindrical surface is formed by a generatrix moved along a predetermined Cassini line of a closed type, or an ellipse or an oval with suitable parameters. As shown on FIG. 1b, on the outer surface of each of the rotors, in its frontal part, a peripheral concaved surface portion (M) is made (preferably, milled out), being formed by the aforesaid curved line, preferably, an ellipse. Each rotor 16 or 17 is associated with two 'own' traverses 7 (upper and lower) that allows taking off power from the shaft 20 at each 90-degree turn of the shaft, increasing effectiveness and smoothness of the engine's operation.

A pinion (21) of a supplemental equipment drive (21) and a nave (22) of a fly-wheel (23) are secured on the shaft 20. Before installation into the engine, the elements 16,17,18,19, 20,21,22,23 are assembled into a single unit, and undergo static and dynamic balancing, to avoid vibrations during operation of the engine.

As illustrated on FIG. 3b, each traverse 7 has a protrusion (A), having a convex spherical surface in its lower portion capable of cooperating with the aforementioned surface M of the rotor.

The protrusion A is so positioned that during operation of the engine after its start, there is a predetermined clearance between the surface of protrusion A and the surface M, preferably, of 0.5 mm. The protrusion A is used to provide the start of the engine, as described below, and is not operatively used after the start.

As illustrated on FIG. 3b, each traverse 7 has a nest, arranged for mounting a slide (11) of a hydro-lock. The hydro-lock serves for taking off inertial loads applied to the rotor in dead points, which loads are produced by the moving traverse and the pistons. Its operation was described in U.S. Ser. No. 11/827,595.

A conventional support bearing (10) (of a slipper type in preferred embodiments) is mounted on each traverse 7, which bearing 10 uses liquid friction. Thus, in a preferred embodiment, the engine comprises four support bearings 10. Each slipper bearing 10 comprises an external cylindrical bushing, an internal cylindrical pin, and a revolvable insertion therebetween. The external bushing operatively rolls over the inner surface of the rotor 16 or 17, impelling the rotor, and thereby converting the linear movement of the traverse 7 into rotation of the rotors. This type of bearing provides reliable operation of diesel engines, since it is capable to absorb high strike loads while the rotational speed of the bearing can range from 40,000 to 60,000 RPM. However, other embodiments may utilize other types of support bearings.

The configuration of traverse 7 permits arranging the point of interaction between the rotor and the bearing 10 lower than it was in the engine's design of U.S. Ser. No. 11/827,595. In turn, this reduces the load onto the bearing and allows reducing the size of the rotor. The rod 8 and traverse 7 have holes of predetermined sizes (shown on FIG. 3b) drilled therein that are used for lubrication and cooling the bearings 10.

As depicted on FIG. 1b, the rods 8 are supportably embraced by guiding bearings (preferably of a slipper type), within which guiding bearings the rods are capable of operative linear running. Thus, the engine includes eight guiding bearings. Each guiding bearing preferably comprises a casing (26) and an axle-bushing (27) impressed therein (reflected on FIG. 1b). The casing 26 is mounted in the lid 25 (FIG. 1a) by bolts, i.e. the casing 26 is essentially stationed on the block 1. The guiding bearings absorb the load produced due to interaction of the support bearings 10 with the inner surface of rotors 16 and 17, and simultaneously guide oil for cooling the pistons 6 via the orifices drilled in the rod 8 and traverse 7. The process of fuel injection is regulated by a conventional pre-programmed control unit (not illustrated).

Operation of the Preferred Embodiment

The protrusion A of the traverse 7 plays an important role in the engine's operation. When the engine is in a stop position, the rotors 16 and 17 can be positioned at any angle within 360 degrees, causing the upper pistons 6 to shut the inlet windows B, and preventing air to inlet into the sleeve. Therefore, the rotors 16 and 17 (FIG. 1b) cannot act via the bearings 10 upon the traverse 7, and hence cannot inlet air into the sleeve. In the other words, the engine cannot be started without the protrusions A. Besides, during rotation of the rotors 16 and 17, a striking engagement of the bearings 10 with the rotors is possible, leading to breakage of the engine, which is prevented by the protrusion A.

After the engine is shut down, independently on the positions of rotors 16 and 17, the upper traverses 7 with pistons 6 and bearings 10 will descend due to gravitation forces, taking out the aforesaid clearance, and the protrusion A will meet the counterpart surface M of the rotors, providing their strike-less engagement and displacement of the pistons 6 for opening the inlet windows B.

The engine operates as follows (see FIGS. 1b, 2b, 3b, and 4):

At start time, the fly-wheel 23 begins revolving, driven by an outside source (e.g., electro-starter, air-starter, kick-starter, etc.), and conveys the rotation via the shaft 20 to the rotors 16 and 17, and the pinion 21 of a supplemental equipment drive. Through a belt transmission, the pinion 21 drives the supercharger that pumps air into the sleeves, for example, under pressure of 1.4-1.5 kG/cm$^2$. This pressure range is chosen for the purpose of comparison with a common two-stroke internal combustion engine, whose crank chambers have a similar pressure created by its pistons. While rotating, the rotors 16 and 17 drive pistons 6 by means of the protrusions A of the traverse 7. The movement of the pistons controls the intake of air and the exhaust of gases.

Exemplary operation of the rotor 17 is shown on FIG. 1a. In the illustrated position, the pistons 6 are situated in the upper dead point and shut the inlet window B and the outlet window D. In the course of rotation, the rotor via the protrusions A displaces the pistons toward the lower dead point, which causes opening the inlet window B and outlet window D, and a portion of fresh air under pressure is introduced into the sleeve.

Thereafter, the rotor drives the bearings 10 toward the upper dead point, which bearings shut first the inlet windows B, and then the outlet windows D. At this time, within the additional 6-7 degree turn, the orifice C (shown on FIG. 2b) is still open, that allows filling the sleeve 4 with a portion of fresh air with the filling coefficient essentially equal to 1.0. Since the orifice is aligned tangentially to the sidewalls of the sleeve, an intense whirling of air will occur, enhancing the intermingling of the fuel-air mixture.

In the course of 180-degree revolving, the pistons arrive at the upper dead point, compressing the air in the sleeve. At a predetermined point, preceding the upper dead point, the pre-programmed control unit sends a command to inject fuel into the combustion chamber of the sleeve.

At this time, the fuel-air mixture is ignited and the engine begins the work stroke. From this moment, an increased pressure of air or gases is permanently present in the sleeve until the engine will be shut down, which pressure via the pistons 6 and traverse 7 causes the external bushings of the bearings 10 to be depressed against the inner surface of rotor 17 and disengages the protrusion A of the traverse 7 from the rotor's inner surface.

Alternative Embodiments

Alternatively, the inventive two-stroke engine can be embodied as a module, and a number of such modules can be assembled into a more powerful module engine, which in turn can be assembled into a power installation comprising several such module engines.

Figure 4A:
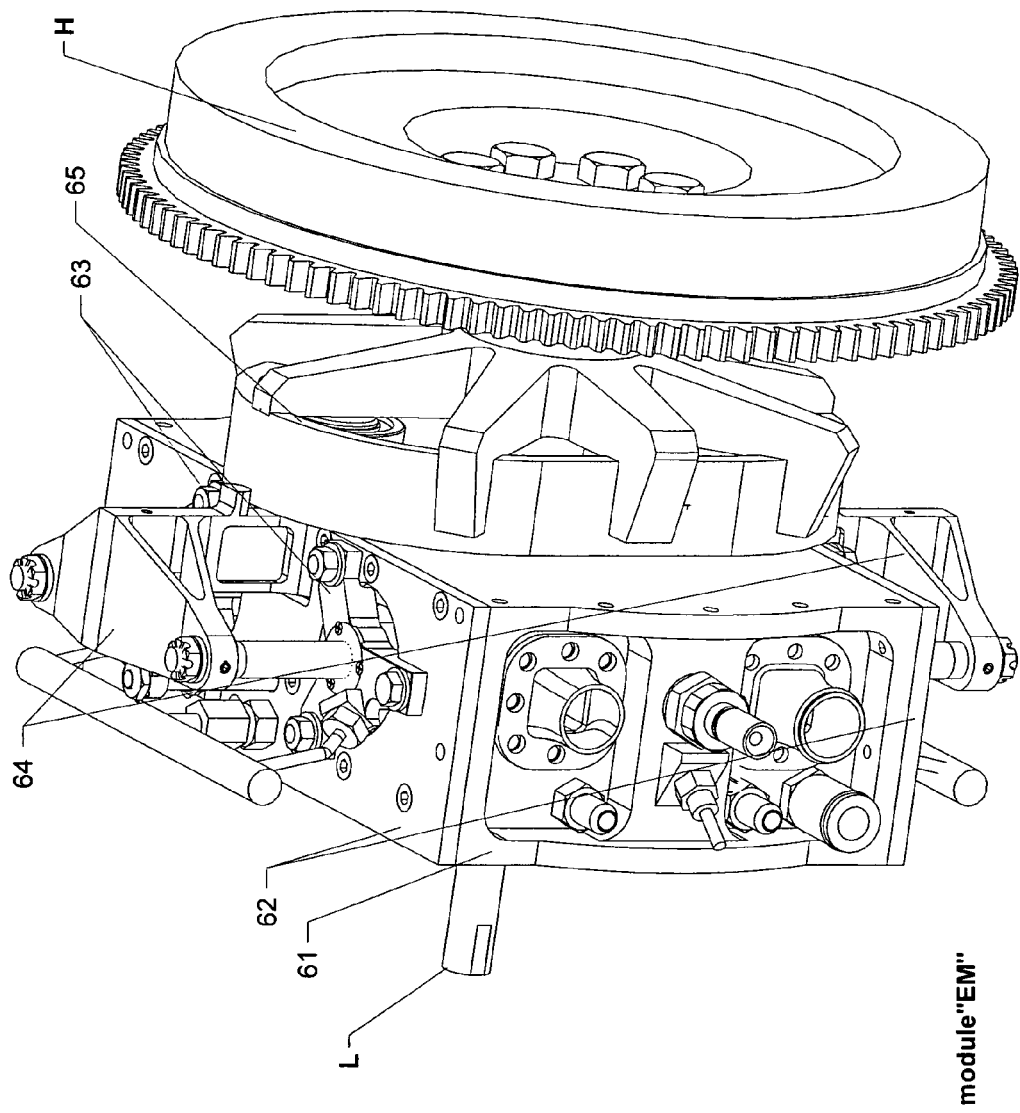
FIG. 4a illustrates an isometric partial view of a module of engine, according to an alternative embodiment of the present invention.

FIG. 4a shows an inventive module engine (EM), which essentially represents a half of the above-described engine of the preferred embodiments illustrated on FIGS. 1a, 1b, 2a, 2b, 3a, 3b, and 4. The module EM comprises a cylinder block (61) with two sleeves (identical to sleeves 4), upper and lower covers (62), within which four guiding bearings (63) (having casing 26 and axle-bushing 27) are mounted to guide four piston rods (identical to rods 8), two traverses (64) (identical to traverse 7) each assembled with two pistons (identical to pistons 6); and two support bearings (identical to bearings 10) each assembled with one traverse 64, one rotor (65) (identical to rotor 16) with a power takeoff shaft (L) (identical to shaft 20—not shown on FIG. 4a) and a fly-wheel (H) (identical to fly-wheel 23).

The number of the above-indicated units in an 'n'-module engine is determined by multiplying their above quantity by 'n' (wherein 'n' is a positive integer number starting from 2).

The power takeoff shaft and the fly-wheel are manufactured separately for each module engine depending on its power, i.e. a two-module engine would have a shaft and fly-wheel different from those for a four-module engine. In a multi-module engine, the shaft can be made either as a whole unit, or divided into portions connected to each other through conventional clutches.

The axes of rotors 65 of two adjacent modules being assembled are oriented at a certain angle to each other. For a two-module engine (identical to the one described above in the preferred embodiments), the angle is 90 degrees; for a three-module engine the angle is 60 degrees, for a four-module engine the angle is 45 degrees (see FIG. 5a), etc.

For the embodiment shown on FIG. 5a, the angular difference of 45 degrees may be imposed in a predetermined order. For instance, the 45-degree angular difference can be imposed between rotors 65-11 and 65-12, between 65-12 and 65-21, between 65-21 and 65-22, and between 65-22 and 65-11. Alternatively, the 45-degree angular difference can be imposed between rotors 65-11 and 65-21, between 65-21 and 65-12, between 65-12 and 65-22, and between 65-22 and 65-11.

Hence, for a 'n'-module engine, the angle difference would be 180 degrees divided by 'n', wherein the angle difference between the rotors' transverse axes is arranged in a predetermined order between the rotors.

Figure 5:
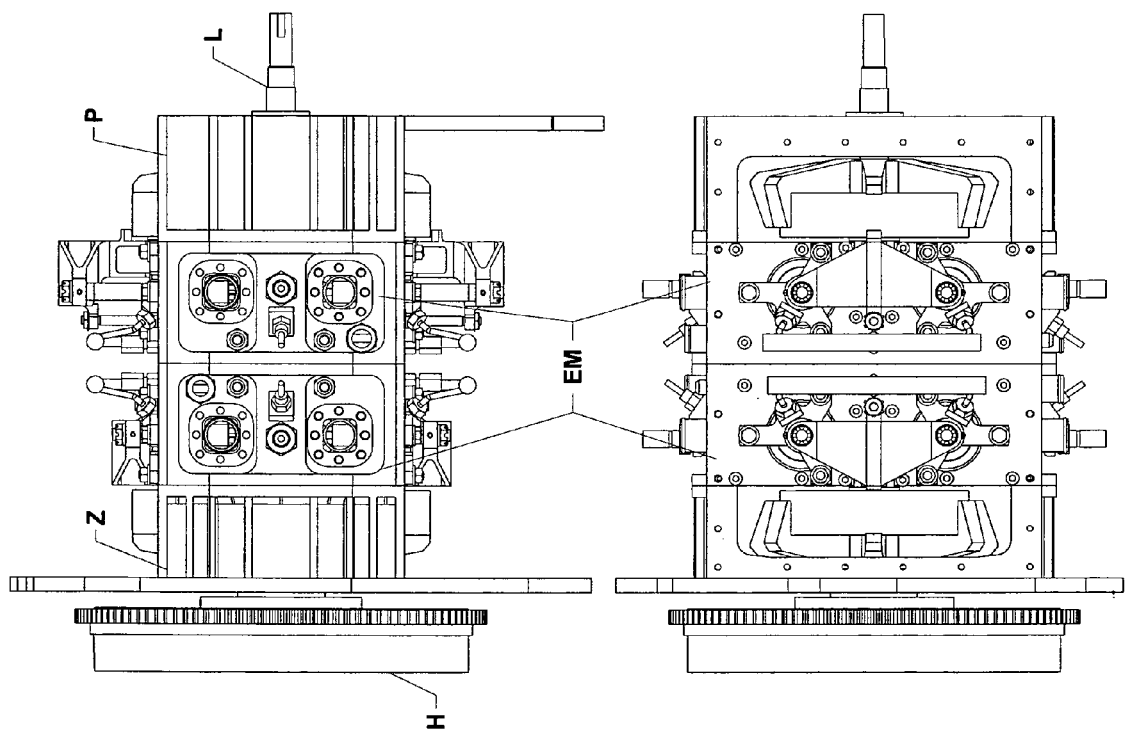
FIG. 5 illustrates a front view and a plan view of an engine assembled of two modules, according to an alternative embodiment of the present invention.

The modules can be made of several volumes of e.g. 50, 100, 150, ..., 500 cc (in some special embodiments even more) for engines' power from 25 to for example 250 hp. FIG. 5 exemplarily displays a two-module engine EM with a volume of 500 cc and power of 250 hp. It includes a common shaft L, fly-wheel H, front housing (P), and rear housing (Z).

Figure 6:
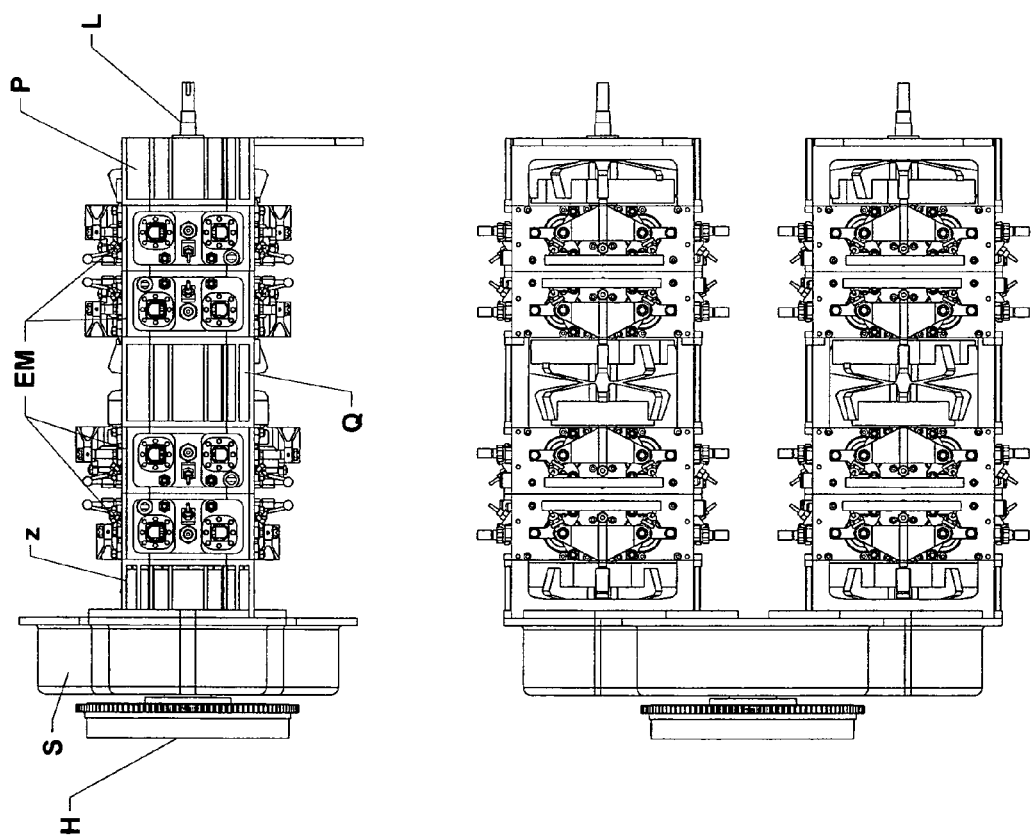
FIG. 6 illustrates a front view and a plan view of a power installation comprising two engines, each assembled of four modules, according to an alternative embodiment of the present invention.

Generally, a power installation may comprise 'k' of the 'n'-module engines described above, wherein 'k' is a positive integer number starting from 2. FIG. 6 depicts a sample power installation comprising two four-module engines EM each of 500 hp ('k' is equal to 2, 'n' is equal to 4). The two engines EM each has its own common takeoff shaft L. The two takeoff shafts disposed parallel to each other. Each of the takeoff shafts, preferably through a conventional clutch (not shown), is associated with a power takeoff gear (S). An insert housing (Q) is mounted between the two engines to accommodate at least two rotors of the adjacent modules of the two engines, as shown on the bottom view of FIG. 6. The installation, shown on FIG. 6, may use either one or two engines depending on the required power. Other installation embodiments may utilize different known types of takeoff gear, and different arrangements of the takeoff shafts. Such installations can find application in heavy long-distance and open pit trucks, large buses, tanks, escalators, small vessels and airplanes.

We claim:

1. A two-stroke opposite radial rotary-piston engine comprising:
 a module including:
  stationary housing means;
  a stationary cylinder block assembled with the stationary housing means, said stationary cylinder block including:
   an intake channel and an exhaust channel;
   two cylindrically shaped sleeves,
    wherein each of two cylindrically shaped sleeves further comprises:
     inner sidewalls,
     an inlet window and an outlet window of predetermined sizes and configurations, being positioned in the inner sidewalls at predetermined locations, wherein said inlet and outlet windows correspondingly communicate with said intake channel and said exhaust channel;
  two pairs of pistons,
   wherein each of the pistons from said two pairs of pistons has a rod and a head, wherein said head is situated oppositely to the rod,
   wherein each pair of the pistons slidingly disposed within one of said sleeves so that the rods facing the upper and lower openings of the corresponding sleeve, wherein each of said pair of pistons is oppositely linearly movable in relation to each other forming a common chamber defined by the heads of the pistons and a portion of the inner sidewalls of the sleeve is positioned between the heads of the pistons;

two pairs of guiding bearings essentially stationed on the block, wherein said rods operatively linearly run within said guiding bearings;

a rotor having an inner operation surface formed by a predeterminedly curved line of a closed type having a transverse axis,
  wherein said rotor on the frontal part of its outer surface includes a peripheral concaved surface portion formed therein along said curved line;

two T-like traverses so mounted that pair-wise spanning said rods attached thereto,
  wherein said traverses are associated with said rotor,
    wherein each of said traverses includes a protrusion, having a convex spherical surface in its lower portion operatively cooperating with said concaved surface portion,
    wherein a predetermined clearance between said concaved surface portion and said convex spherical surface of the protrusion is operatively provided;

said engine further comprising:
  a power takeoff shaft rotatable supported substantially by the stationary housing means of said module;
    wherein said rotor is fixedly mounted on the takeoff shaft; and
  two support bearings, each coupled to one of said traverses,
    wherein each of said two support bearings includes an external bushing operatively rolling over the inner surface of the rotor, thereby propelling the rotor.

2. A two-stroke opposite radial rotary-piston engine comprising:
  stationary housing means;
  a stationary cylinder block assembled with the stationary housing means, said stationary cylinder block including:
    an intake channel and an exhaust channel;
    four cylindrically shaped sleeves,
      wherein each of said four cylindrically shaped sleeves further comprises:
        inner sidewalls,
        an inlet window and an outlet window of predetermined sizes and configurations, being positioned in the inner sidewalls at predetermined locations, wherein said inlet and outlet windows correspondingly communicate with said intake channel and said exhaust channel;
    four pairs of pistons,
      wherein each of said pistons has a rod and a head wherein said head is situated oppositely to the rod,
      wherein each pair of the pistons is slidingly disposed within one of said sleeves so that the rods are facing the upper and lower openings of the corresponding sleeve,
      wherein said pair of pistons is oppositely linearly movable in relation to each other forming a common chamber defined by the heads of the pistons and a portion of the inner sidewalls of the sleeve wherein said portion of the inner sidewalls is positioned between the heads of the pistons;
    four pairs of guiding bearings essentially stationed on the block,
      wherein said rods operatively linearly run within said guiding bearings;
    a power takeoff shaft being rotatably supported substantially by the stationary housing means;
    two substantially identical rotors fixedly mounted on the takeoff shaft, each of the two substantially identical rotors having an inner operation surface formed by a predeterminedly curved line of a closed type having a transverse axis,
      wherein the transverse axes of said two rotors are disposed substantially perpendicularly to each other, and
      wherein each said rotor on the frontal part of its outer surface including a peripheral concaved surface portion formed therein along said curved line;
    four T-like traverses so mounted that pair-wise spanning said rods attached thereto,
      wherein each pair of said traverses are pair-wise associated with one of said rotors,
      wherein the each pair of said traverses includes a protrusion, having a convex spherical surface in its lower portion cooperating with said concaved surface portion during a start of said engine, and
      wherein a predetermined clearance between said concaved surface portion and said convex spherical surface of the protrusion is operatively provided after the start of said engine; and
    four support bearings,
      wherein each of said four support bearings is coupled to one said traverse, and
      wherein each of said four support bearings includes an external bushing operatively rolling over the inner surface of the rotor associated with the traverse being coupled to the support bearing, thereby propelling the rotors.

3. The two-stroke opposite radial rotary-piston engine according to claim 2, wherein each of said four cylindrical shaped sleeves further includes orifices of predetermined sizes and having predetermined locations, and wherein said orifices communicate with the intake channel.

4. The two-stroke opposite radial rotary-piston engine according to claim 3, wherein said orifices are aligned at a tangential direction to the sidewalls of said four cylindrical shaped sleeves.

5. The two-stroke opposite radial rotary-piston engine according to claim 2, wherein said predetermined clearance between said concaved surface portion and said convex spherical surface of the protrusion is 0.5 mm.

6. The two-stroke opposite radial rotary-piston engine according to claim 2, wherein said four guiding bearings are of a slipper type.

7. The two-stroke opposite radial rotary-piston engine according to claim 2, wherein said four support bearings are of a slipper type.

8. The two-stroke opposite radial rotary-piston engine according to claim 2, wherein said predeterminedly curved line of the closed type is one of the following: a Cassini line of a symmetrically closed type, an ellipse, and an oval.

9. The two-stroke opposite radial rotary-piston engine according to claim 2, wherein said engine further comprises four slides of a hydro-lock, and wherein each of said traverses includes a nest supporting one of said slides.

10. The two-stroke opposite radial rotary-piston engine according to claim 2, wherein said rods and said traverses include holes of predetermined sizes drilled therein for lubricating and cooling said four support bearings.

11. A two-stroke opposite radial rotary-piston engine comprising:
- a plurality of 'n' modules, wherein said 'n' modules are an integer number starting from 2, and wherein each of said 'n' modules includes:
- stationary housing means;
- a stationary cylinder block assembled with the stationary housing means,
  - wherein said stationary cylinder block further includes:
  - an intake channel and an exhaust channel;
- two cylindrically shaped sleeves,
  - wherein each of the two cylindrically shaped sleeves further comprises:
    - inner sidewalls,
    - an inlet window and an outlet window of predetermined sizes and configurations, being positioned in the inner sidewalls at predetermined locations,
    - wherein said inlet and outlet windows correspondingly communicate with said intake channel and said exhaust channel;
- two pairs of pistons,
  - wherein each of said pistons has a rod and a head,
- wherein said head is situated oppositely to the rod,
  - wherein each pair of the pistons is slidingly disposed within one of said sleeves so that the rods are facing the upper and lower openings of the corresponding sleeve,
  - wherein said pair of pistons is oppositely linearly movable in relation to each other forming a common chamber defined by the heads of the pistons and a portion of the inner sidewalls of the sleeve is positioned between the heads of the pistons;
- two pairs of guiding bearings essentially stationed on the block,
  - wherein said rods operatively linearly run within said guiding bearings;
- a rotor having an inner operation surface formed by a predeterminedly curved line of a closed type having a transverse axis,
  - wherein said rotor on the frontal part of its outer surface includes a peripheral concaved surface portion formed therein along said curved line;
- two T-like traverses so mounted that pair-wise spanning said rods attached thereto,
  - wherein said traverses are associated with said rotor,
  - wherein each of said traverses includes a protrusion, having a convex spherical surface in its lower portion operatively cooperating with said concaved surface portion,
  - wherein a predetermined clearance between said concaved surface portion and said convex spherical surface of the protrusion is operatively provided;
- said engine further comprising:
  - a power takeoff shaft rotatably supported substantially by the stationary housing means of said modules,
    - wherein each of said rotors of the modules is mounted on the takeoff shaft;
    - wherein the transverse axes of said rotors of the modules are disposed to each other at an angular difference equal to 180 degrees divided by 'n' arranged in a predetermined order between the rotors; and
  - two multiplied by 'n' support bearings,
    - wherein each of said 'n' support bearings is coupled to one said traverse, and
    - wherein each of said 'n' support bearings includes an external bushing operatively rolling over the inner surface of the rotor associated with the traverse being coupled to the support bearing, thereby propelling the rotors.

12. The two-stroke opposite radial rotary-piston engine according to claim 11, wherein said power takeoff shaft is performed as a whole unit.

13. The two-stroke opposite radial rotary-piston engine according to claim 11, wherein said power takeoff shaft is divided into portions connected to each other through conventional clutches.

14. A power installation comprising:
- a power takeoff gear; and
- at least two engines according to claim 11,
  - wherein each of the at least two engines has its own common takeoff shaft, and
  - wherein said common takeoff shafts of said at least two engines are disposed in parallel to each other and associated through a conventional clutch with said power takeoff gear.

\* \* \* \* \*